April 27, 1965      G. E. FRANCK      3,180,664
BALL PIPE JOINT WITH COMPOSITE BALL MEMBER
Filed July 20, 1961
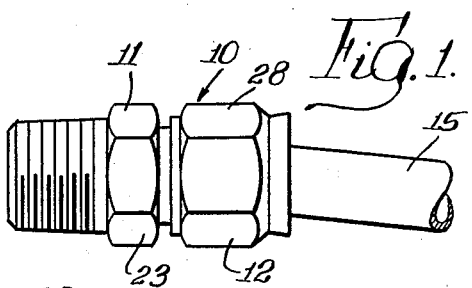
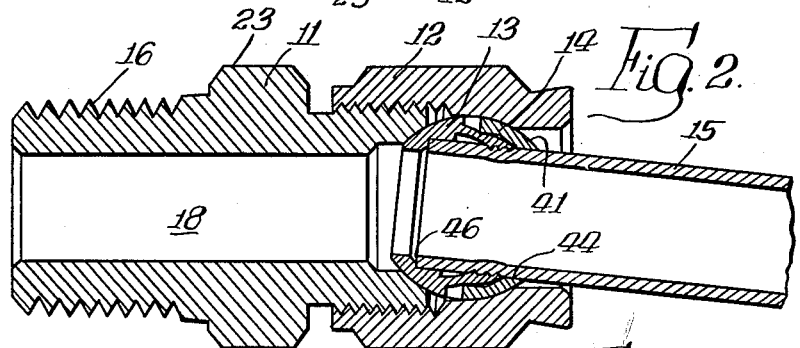
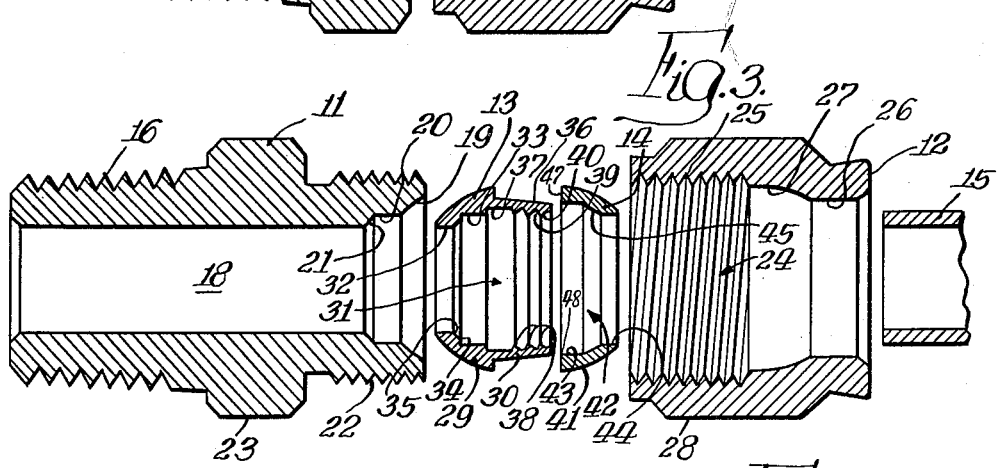
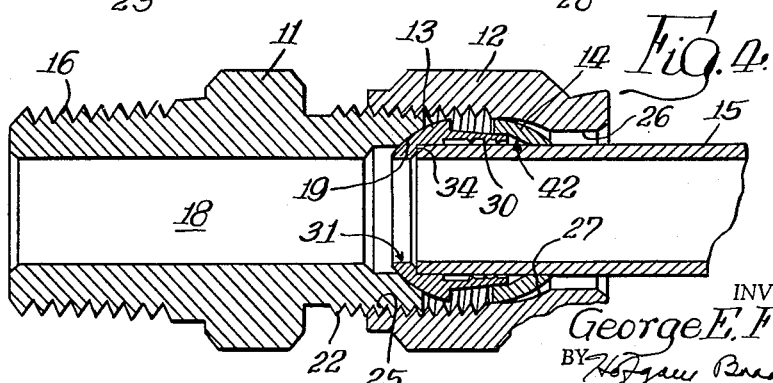
INVENTOR.
George E. Franck, United States Patent Office 3,180,664
Patented Apr. 27, 1965

3,180,664
BALL PIPE JOINT WITH COMPOSITE
BALL MEMBER
George E. Franck, Morton Grove, Ill., assignor to Imperial-Eastman Corporation, a corporation of Illinois
Filed July 20, 1961, Ser. No. 125,402
8 Claims. (Cl. 285—266)

This invention relates to fittings and in particular to fittings for use with straight-ended tubes.

One well-known method of coupling a straight-ended tube to another element is to provide a fitting having a constrictible sleeve adapted to bite into the wall of the tube end. The fitting is further provided with co-operating nut and body members which effect the constriction of the sleeve and which complete the sealed connection of the tube end to the element to which the tube end is to be connected. An excellent example of an improved fitting of this type is that shown in my Patent No. 2,934,362, issued April 26, 1960.

While such fittings have proven highly efficient in coupling such straight-ended tubes where the tube end is capable of being accurately coaxially aligned with the fitting, it has been found that such fittings do not always provide positive sealed connection of the tube end where the tube end is substantially disaligned relative to the fitting axis. Such disalignment may occur as a result of the disalignment of the elements between which the tubing extends or as a result of a short run of the tubing from a bend closely adjacent the element to which the fitting is connected. As a result of such disalignment, the constrictible sleeves are cocked within the fitting and an imperfect seal may result. Further, such disalignment may cause a stripping or crossing of the threads of the fitting. This presents a very serious problem, particularly where the tubing is arranged to carry relatively high pressures.

The present invention comprehends a new and improved fitting utilizing a constrictible sealing sleeve for coupling a straight-ended tube, including means for assuring a positive sealed coupling of the tube end notwithstanding substantial disalignment thereof relative to the axis of the fitting.

Thus, a principal object of the invention is to provide a new and improved fitting of the type utilizing a constrictible sealing sleeve.

A further object of the invention is to provide such a fitting having new and improved ball means cooperating with the constrictible sleeve to accommodate the sleeve to different tube positions.

A further object of the invention is to provide such a fitting having a new and improved sealing sleeve and camming sleeve structure co-operating with the fitting body and nut to provide an improved coupling of the tube end.

Still another object of the invention is to provide such a fitting having a new and improved camming sleeve co-operating with the fitting nut to provide an improved constriction of the sealing sleeve into sealed engagement with the tube end.

Other features and advantages of the invention will be apparent from the following description taken in connection with the accompanying drawing wherein:

FIG. 1 is a side elevation of a fitting embodying the invention to which a tube end is connected;

FIG. 2 is an enlarged diametric section thereof;

FIG. 3 is an exploded diametric section thereof; and

FIG. 4 is a diametric section illustrating the arrangement of the fitting and tube end as at the initiation of the make-up operation.

In the exemplary embodiment of the invention as disclosed in the drawing, a fitting generally designated 10 is shown to comprise a body member 11, a nut member 12, a sealing sleeve 13, and a camming sleeve 14. The fitting 10 is arranged to connect a straight-ended tube 15 to another element (not shown) and for this purpose, the body 11 is provided with an exteriorly threaded portion 16 arranged for threaded connection to such an element. As shown in FIG. 1, the tube 15 may be axially disaligned with the axis of the fitting, herein the disalignment may be up to approximately 6° from the axial position. As shown in FIG. 2, the sealing sleeve 13 provides a positive sealing connection of the tube end to the body 11 up to the maximum axial angular displacement permitted by the nut 12.

More specifically, as seen in FIG. 3, the body 11 is provided with a through bore 18 opening at its outer end coaxially through the threaded portion 16. At its inner end, the bore 18 is defined by a segmentally spherical concave annular seat 19, a cylindrical portion 20 extending coaxially outwardly from seat 19, and a frusto-conical portion 21 extending coaxially outwardly from cylindrical portion 20. The inner end of the body is exteriorly defined by a threaded portion 22 and intermediate the threaded portions 16 and 22 the body is provided exteriorly with a plurality of flats 23 for co-operation with a suitable tool such as a wrench during the make-up of the fitting.

Nut 12 is provided with a through bore 24 defined at its inner end by a threaded portion 25 cooperating with threaded portion 22 of the body to provide an axial movement of the nut relative to the body as an incident of the threaded advance of nut portion 25 on body portion 22. At the outer end, bore 24 is defined by a cylindrical portion 26 having a diameter substantially larger than the outer diameter of the tube end 15 to permit a substantial angular disalignment of the tube end relative to the nut as shown in FIG. 2. Intermediate the portions 25 and 26, the bore 24 is defined by a segmentally spherical outwardly concave surface 27, herein having a curvature similar to the curvature of the body seat 19. The nut is exteriorly defined by a plurality of flats 28 similar to flats 23 for co-operation with a suitable tool such as a wrench in making up the fitting.

Sealing sleeve 13 includes an outer ball portion 29 complementary to seat 19, and an inner constrictible portion 30. A bore 31 extends axially through the sleeve 13 and is defined by an outer cylindrical portion 32 having a diameter substantially equal to the minimum diameter of body bore 18. Axially inwardly of the cylindrical portion 32, the bore 31 is defined by an enlarged cylindrical portion 33 having a diameter substantially equal to the outer diameter of the tube 15. Intermediate the bore portions 32 and 33, the bore is defined by a radial shoulder 34 and a frusto-conical shoulder 35.

Constrictible sleeve portion 30 is exteriorly defined by a frusto-conical inwardly narrowing surface 36. Internally, the constrictible portion 30 is defined by a frusto-conical inwardly narrowing surface 37 from which projects radially inwardly a plurality of annular teeth 38 adapted to bite into the wall of the tube end 15 as a result of the constriction of portion 30. As best seen in FIG. 3, the teeth 38 have a triangular cross section in the axial plane. In the illustrated embodiment, the triangular cross section is asymmetric to the radii of the sleeve in the axial plane and extending through the apexes of the respective teeth. Thus, each annular tooth is defined by a frusto-conical outer surface 39 and a frusto-conical inner surface 40 having an area substantially greater than the area of the outer surface 39.

The camming sleeve 14 comprises a deflectable annular member defined by a segmentally spherical outer surface 41, herein having a radius of curvature smaller than the radius of curvature of the segmentally spherical surface 27 of nut 12. A bore 42 extends axially through the camming sleeve 14 and is defined by an outer cylindrical surface 43 having a diameter greater than the minimum diameter of sealing sleeve surface 36, and an inner cylindrical surface 44 having a diameter substantially equal to the outside diameter of the tube 15. Intermediate surfaces 43 and 44, the camming sleeve is provided with a frusto-conical inwardly narrowing surface 45 adapted to engage and deflect radially inwardly the constrictible portion 30 of the camming sleeve. As best seen in FIG. 3, the axial extents of cylindrical surfaces 43 and 44 and frusto-conical surface 45 are approximately equal. Further as shown in FIG. 3, the cylindrical surface 43 intersects an outer end surface 47 of the sleeve to define an annular edge 48 therebetween.

The make-up of the fitting 10 is extremely simple. The tube end 15 is inserted through the nut bore 24 from end 26 to end 25 thereof. Camming sleeve 14 is installed over the tube end and sealing sleeve 13 is then installed over the tube end so that the ball surface 41 of the camming sleeve confronts the ball surface 27 of the nut and the ball portion 29 of the camming sleeve overlies the distal end of the tube 15. The assembly is then brought to adjacent the body seat 19 and nut 12 is threaded onto the portion 22 of the body to the position of FIG. 4. In this position, the distal end 46 of the tube 15 is in abutment with the radial shoulder 34 of the sealing sleeve and the ball portion 29 of the sealing sleeve is seated on seat 19 thereby retaining the tube 15 against further axial movement into the bore 18 of the body.

Further threaded advance of nut 12 on body portion 22 causes surface 27 of the nut bearing against the surface 41 of the camming sleeve to urge the camming sleeve axially along the tube 15 and forces the surface 45 against the constrictible portion 30 of the sealing sleeve to press the annular teeth 38 into the wall of the tube 15 in firm sealing engagement therewith. As the teeth 38 are effectively underturned slightly, they bite into the tube wall, positively locking the tube 15 against axial movement from the fitting. As the outer surface 41 of the camming sleeve is segmentally spherical, the camming sleeve may be axially disaligned with the axis of body bore 18 in conformity with the axis of the tube 15. The constrictible portion 30 of sealing sleeve 13 is arranged so that the full penetration of the teeth 38 is effected when the camming sleeve 14 reaches the position of FIG. 2 wherein the center of curvature of the surface 41 is substantially coincident with the center of curvature of the body seat 19. The biting of the edge 48 of the camming sleeve 14 into the frusto-conical surface 36 of the sealing sleeve 13 provides a "hit home" indication of the reaching of this truly made-up arrangement of the fitting. Thus, in the made-up condition, the fitting effectively defines a ball sealingly secured to the end of the tube 15 arranged to seal the tube end to the body 11 notwithstanding a substantial axial disalignment of the tube end relative to the axis of the body. The ball includes an improved tube gripping constrictible element arranged so that the forming of the effective ball configuration occurs concurrently with the sealing constriction of the deformable element onto the tube end. The fitting is arranged so that subsequent disassembly and remake-up may be effected as desired.

While I have shown and described one embodiment of my invention, it is to be understood that it is capable of many modifications. Changes, therefore, in the construction and arrangement may be made without departing from the spirit and scope of the invention as defined in the appended claims.

I claim:

1. A fitting comprising: a body provided with a bore having an inner end defining a segmentally spherical, concave, annular seat; a sealing sleeve having an outer ball adjustably sealingly engageable with said seat, and an inner, constrictible portion provided with a radially inwardly projecting annular tooth for sealingly biting into a tube end coaxially disposed therein, said inner portion being defined exteriorly by a frusto-conical, inwardly narrowing outer cam surface; a camming sleeve being defined interiorly by a frusto-conical, inwardly narrowing inner cam surface engageable with said outer cam surface, and a cylindrical outer surface opening through the outer end of the camming sleeve to define a sharp annular edge, said camming sleeve being defined exteriorly by a rounded, outwardly convex surface; and a nut threadedly connected to said body coaxially of said seat and provided with an internal, segmentally spherical, outwardly concave surface engageable with said convex surface of the camming sleeve to urge the camming sleeve longitudinally outwardly and radially inwardly and thereby urge the inner cam surface of the camming sleeve against the outer cam surface of the sealing sleeve to constrict said constrictible portion, said concave surface of the nut having a curvature similar to the curvature of said body seat, and said constrictible portion of said sealing sleeve being arranged to be constricted to have said annular tooth bite fully into the tube end when the center of curvature of the camming sleeve is disposed at the center of curvature of said sealing sleeve ball, said annular edge of the camming sleeve being arranged to dig into said cam surface of the sealing sleeve to limit the outward movement of the camming sleeve to said position wherein it is concentric with said sealing sleeve ball.

2. The fitting of claim 1 wherein said convex surface of the camming sleeve has a radius of curvature substantially less than the radius of curvature of said concave surface of the nut.

3. The fitting of claim 1 wherein said annular tooth has a triangular cross section in an axial plane asymmetric to a radius of the sleeve in said plane.

4. The fitting of claim 1 wherein said annular tooth defines an outer frusto-conical surface and an inner frusto-conical surface having an area substantially greater than the area of said outer frusto-conical surface.

5. The fitting of claim 1 wherein the axial extent of said cylindrical outer surface of the camming sleeve is approximately equal to the axial extent of the frusto-conical outer cam surface of the sealing sleeve.

6. The fitting of claim 1 wherein the camming sleeve further includes a cylindrical inner surface opening through the inner end of the camming sleeve, said inner surface having a diameter approximately equal to the outside diameter of the tube end.

7. The fitting of claim 1 wherein the camming sleeve further includes a cylindrical inner surface opening through the inner end of the camming sleeve, said inner surface having a diameter approximately equal to the outside diameter of the tube end, the axial extent of the cylindrical inner surface of the camming sleeve being approximately equal to the axial extent of the frusto-conical outer cam surface of the sealing sleeve.

8. The fitting of claim 1 wherein said nut is further provided with an internal cylindrical inner surface opening through the inner end of the nut and having a diameter approximately equal to said cylindrical outer surface of the camming sleeve.

References Cited by the Examiner

UNITED STATES PATENTS

| | | | |
|---|---|---|---|
| 1,873,495 | 8/32 | Smittle | 285—266 |
| 2,152,975 | 4/39 | Sanford | 285—249 |
| 2,463,707 | 3/49 | Matousek | 285—341 |
| 2,320,812 | 6/43 | Cowles | 285—343 |
| 2,568,581 | 9/51 | Crain | 285—341 |
| 2,613,959 | 10/52 | Richardson | 285—341 |
| 2,701,149 | 2/55 | Kreidel | 285—341 |
| 2,934,362 | 4/60 | Franck | 285—341 |
| 3,059,948 | 10/62 | Thompson et al. | 287—87 |

FOREIGN PATENTS 405,639 2/34 Great Britain.

CARL W. TOMLIN, *Primary Examiner.*